United States Patent
Cai et al.

(10) Patent No.: US 11,968,228 B2
(45) Date of Patent: Apr. 23, 2024

(54) EARLY MALWARE DETECTION IN ON-THE-FLY SECURITY SANDBOXES USING RECURSIVE NEURAL NETWORKS (RNNs) TO CAPTURE RELATIONSHIPS IN BEHAVIOR SEQUENCES ON DATA COMMUNICATION NETWORKS

(71) Applicant: Fortinet, Inc., Sunnyvale, CA (US)

(72) Inventors: Jun Cai, Coquitlam (CA); Kamran Razi, West Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 146 days.

(21) Appl. No.: 17/117,035

(22) Filed: Dec. 9, 2020

(65) Prior Publication Data

US 2022/0182395 A1     Jun. 9, 2022

(51) Int. Cl.
*H04L 9/40*     (2022.01)
*G06F 9/455*    (2018.01)
*G06F 21/53*    (2013.01)
*G06N 3/044*    (2023.01)
*G06N 3/08*     (2023.01)

(52) U.S. Cl.
CPC ............ *H04L 63/145* (2013.01); *G06F 9/455* (2013.01); *G06F 21/53* (2013.01); *G06N 3/044* (2023.01); *G06N 3/08* (2013.01); *H04L 63/02* (2013.01); *G06F 2221/033* (2013.01)

(58) Field of Classification Search
CPC ....... H04L 63/145; H04L 63/02; G06F 9/455; G06F 21/53; G06F 2221/033; G06F 21/566; G06N 3/0445; G06N 3/08
See application file for complete search history.

(56) References Cited

U.S. PATENT DOCUMENTS

| | | | |
|---|---|---|---|
| 10,360,371 B1 * | 7/2019 | Watson | G06F 21/50 |
| 2018/0063026 A1 * | 3/2018 | Beveridge | G06Q 30/08 |
| 2019/0347415 A1 * | 11/2019 | Yavo | G06F 21/554 |
| 2020/0065213 A1 * | 2/2020 | Poghosyan | G06F 11/3409 |
| 2021/0044604 A1 * | 2/2021 | Annen | G06F 11/1484 |
| 2021/0192043 A1 * | 6/2021 | Bhary | G06F 21/566 |

* cited by examiner

*Primary Examiner* — Maung T Lwin
*Assistant Examiner* — Suman Debnath
(74) *Attorney, Agent, or Firm* — Law Office of Dorian Cartwright; Dorian Cartwright

(57) ABSTRACT

A file copy is executed in a virtual runtime environment that tracks behavior using RNN taking runtime behavior of at least a first time into account with current runtime behavior at a second time. This is responsive to not finding a known signature for suspicious activity during virus scanning. A behavior sequence is identified on-the-fly during file copy execution that is indicative of malware, prior to completing the execution, the behavior sequence involving at least two actions taken at different times during file copy execution. Responsive to the identification, the execution is terminated and the virtual runtime environment is returned to the pool of available virtual runtime environments.

6 Claims, 6 Drawing Sheets

EARLY MALWARE DETECTION IN ON-THE-FLY SECURITY SANDBOXES USING RECURSIVE NEURAL NETWORKS (RNNs) TO CAPTURE RELATIONSHIPS IN BEHAVIOR SEQUENCES ON DATA COMMUNICATION NETWORKS

FIELD OF THE INVENTION

The invention relates generally to computer network security, and more specifically, to identifying malware by capturing relationships in behavior sequences with recursive neural networks (RNNs) during runtime in a sandbox runtime, without full execution.

BACKGROUND

Virus scanning only offers partial protection from malicious files on the Internet downloaded to computing devices. They can predict behavior but cannot determine actual events that will occur.

On the other hand, sandboxing a file for execution is resource intensive. A partitioned section of hardware has to be reserved for this purpose. Dedicated memory, processing, and other resources are consumed with isolating the sandbox environment from the normal computer operations.

Therefore, what is needed is a robust technique for identifying malware by capturing relationships in behavior sequences with RNNs during runtime in a sandbox, without full execution.

SUMMARY

These shortcomings are addressed by the present disclosure of methods, computer program products, and systems for identifying malware by capturing relationships in behavior sequences with RNNs during runtime in a sandbox, without full execution.

In one embodiment, a request for runtime behavioral analysis of a file is received from a virus detection module of a remote networking device (e.g., sandbox client), along with a copy of the file, and responsive to the malware detection module detecting an anomaly without a matching known malware signature. A virtual runtime environment is invoked to execute the file copy from a pool of available virtual runtime environments.

In an embodiment, the file copy is executed in a virtual runtime environment that tracks behavior using RNN taking runtime behavior of at least a first time into account with current runtime behavior at a second time. A behavior sequence is identified on-the-fly during file copy execution that is indicative of malware, prior to completing the execution, the behavior sequence involving at least two actions taken at different times during file copy execution.

In another embodiment, responsive to the identification, the execution is terminated and the virtual runtime environment is returned to the pool of available virtual runtime environments. The malware detection module of the remote networking device is responded to with a positive result to prevent file execution at the remote networking.

Advantageously, computer performance is improved with more efficient scanning and conserving computer resources.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for identifying malware by capturing relationships in behavior sequences with RNNs during runtime in a sandbox, without full execution. One of ordinary skill in the art will recognize many additional variations made possible by the succinct description of techniques below. For example, although RNNs are referred to herein for illustration, different machine learning algorithms with capabilities to capture dynamics governing a sequence or a time series can also be substituted.

Figure 1:
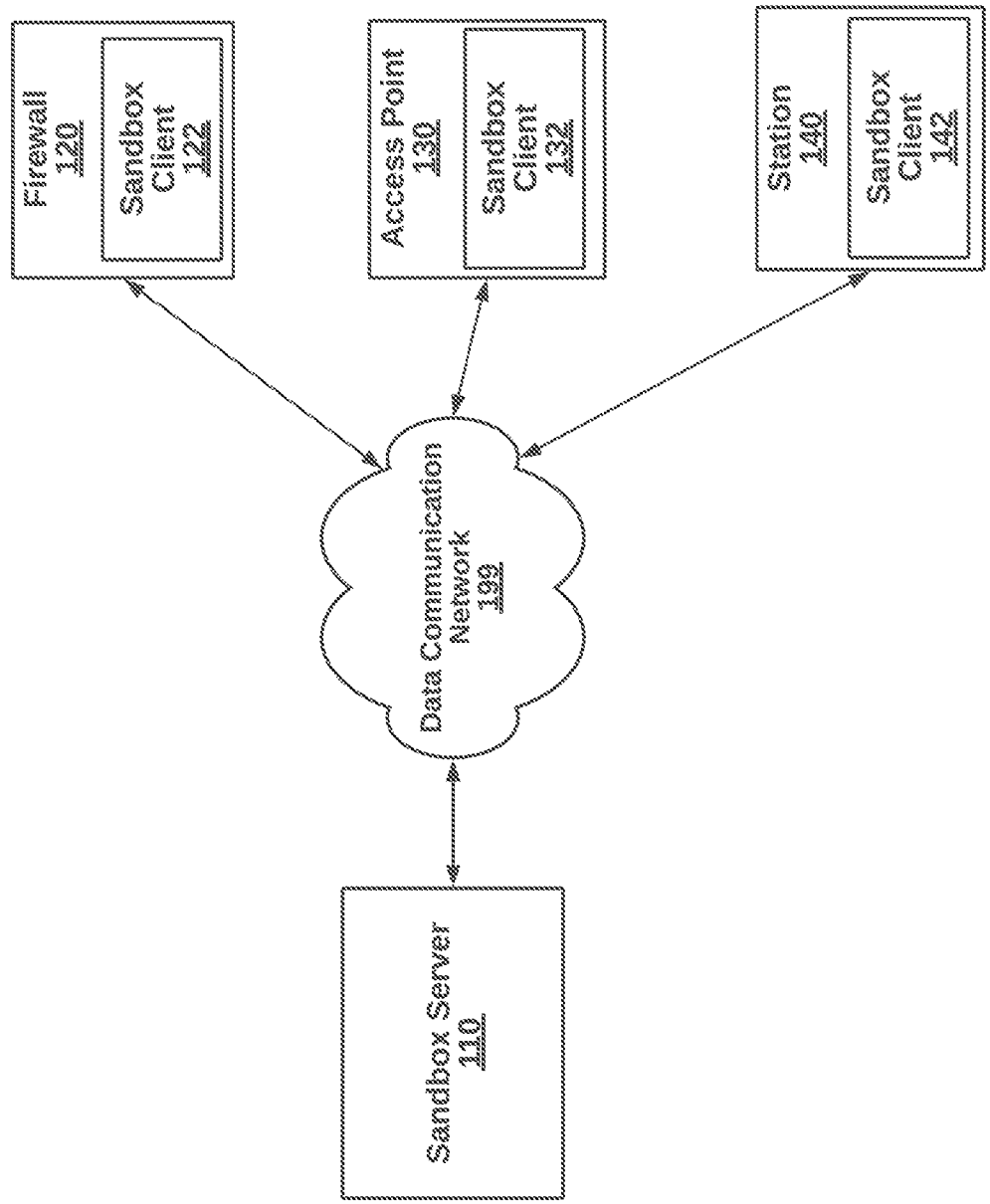
FIG. 1 is a high-level block diagrams illustrating a system for identifying malware by capturing relationships in behavior sequences with RNNs during runtime in a sandbox, without full execution, according to one embodiment.
Figure 2:
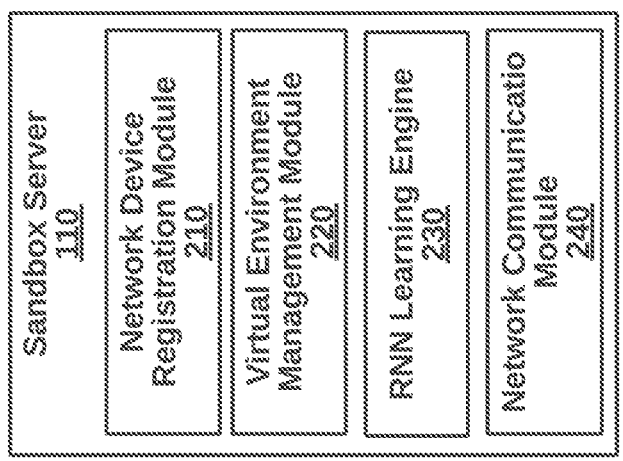
FIG. 2 is a more detailed block diagram illustrating sandbox server of the system of FIG. 1, respectively, according to one embodiment.

I. Systems for RNN Sandbox Malware Detection (FIG. 1-2)

FIGS. 1A-1B are high-level block diagrams illustrating a system 100 for identifying malware by capturing relationships in behavior sequences with RNNs during runtime in a sandbox, without full execution, according to one embodiment. The system 100 includes a sandbox server 110, a firewall server 120, an access point 130, and station 140, coupled through a wide area network. Many other embodiments are possible, for example, with more access points, more or fewer stations, additional components, such as firewalls, routers, switches, and the like. Hardware and software components can be implemented similar to the example of FIG. 6.

The wide area network links components of the system 100 with a channel for data communication. The sandbox server 110, the firewall server 120 and the access point 130 are preferably connected to the wide area network via hardwire. The station 140 are wirelessly connected to the access points 101A-D to access the wide area network indirectly. The wide area network can be a data communication network such as the Internet, a WAN, a LAN, WLAN, can be a cellular network (e.g., 3G, 4G, 5G or 6G), or a hybrid of different types of networks. Thus, the system 100 can be a LAN or include cloud-based devices.

The sandbox server 110 receives requests for runtime behavior analysis from malware detection software (remote or local). A virtual runtime environment is invoked to run a suspicious file and observe behavior for correlation. The sandbox server 110 identifies on-the-fly a behavior sequence during runtime, prior to completing execution. Once identified, the virtual runtime environment can be terminated and returned to availability for a new file. In one embodiment, a pool of virtual runtime environments is administered. A virtual runtime environment, as referred to herein, can be a physically or virtually isolated from processes observing the virtual runtime environment and operation of the sandbox server 110 in general. Files can be executed immediately, installed to an operating system before execution, or executed over a platform such as Java, Flash, PDF, or Microsoft Word (e.g., macros).

In an embodiment, individual non-malicious individual events can be correlated to detect malicious behavior. Machine learning such as RNN uses memory aspects to track evaluate a current event in view of historical events. The current event is matched with various combinations of past events, which together comprise malicious behavior. Behavior patterns can be preprogrammed and derived through experience, i.e., learned. In one embodiment, only part of a file is uploaded to save even more bandwidth, in anticipation of early virus detection. Further file chunks can be uploaded as needed. Additional embodiments of the sandbox server 110 are set forth below with respect to FIG. 2.

Many different network devices can be in communication with the sandbox server 110 to outsource runtime scanning. First, the firewall server 120 (e.g., FORTIGATE) refers suspicious files being transmitted for sandbox scanning to the sandbox server 110. During operations, the firewall server 120 examines files and file requests between an internal network (e.g., a LAN) and an external network (e.g., the Internet). If a virus signature cannot be matched to suspicious activity, a copy of the file is uploaded by a sandbox client 122. Once the positive result is received, the file can be immediately contained responsive to finding runtime malicious behavior. The process occurs quickly while the file in queue for processing because the sandboxing does not need to completely execute a file to find malicious runtime behavior. Responsive to malignant behavior, the file can be forwarded to its destination.

Next, the access point 130 (e.g., FORTIAP) can also refer station file uploads from stations to the sandbox server 110 for sandbox scanning. At this particular network device, files sent by the station 140 over Wi-Fi for transmission can be selected by the sandbox client 132 for scanning upstream. Downstream traffic sent to the station 140 may be examined by the firewall server 120, but some embodiments of the system 100 may not have firewalls and consequentially downstream traffic can be examined by the access point 130.

Additionally, some embodiments the station 140 can actively refer files downloaded by the station or even loaded through a USB drive or other physically connected device source locally. While the firewall server 120 and the access point 130 are integrated on the network side, the station 140 may need to download a client app for easy access to the sandbox server 130. The downloaded client can interoperate with local virus scanning, such as sandbox client 142, to detect when a referral is needed.

Figure 6:
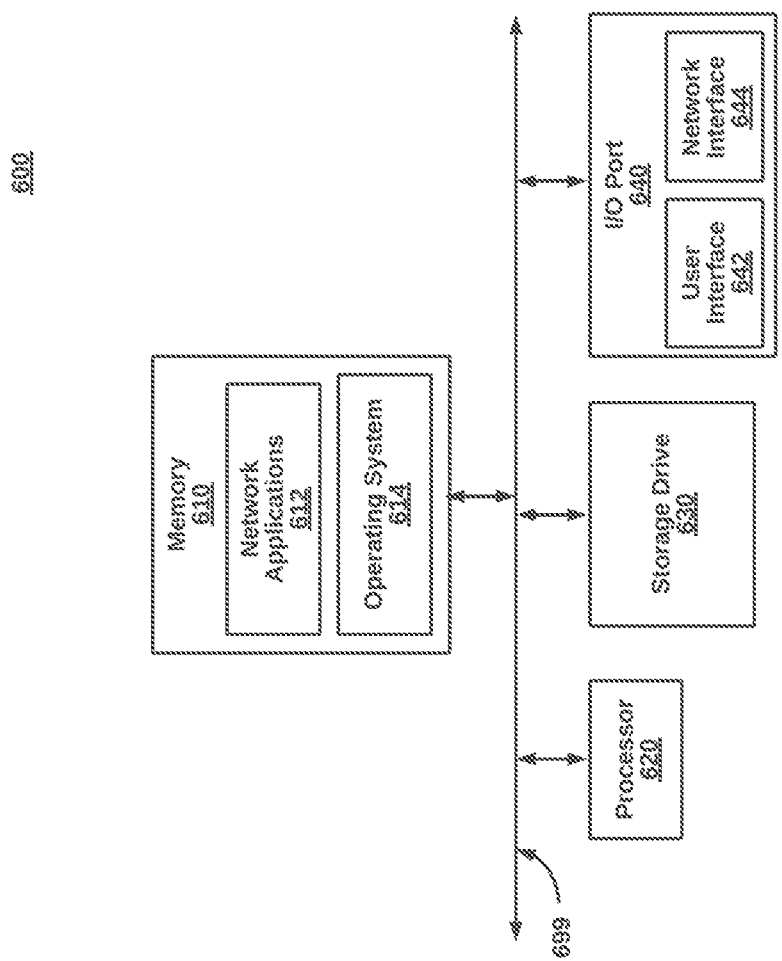
FIG. 6 is a block diagram illustrating an example computing device, according to one embodiment.

The network components of the system 100 can implemented in any of the computing devices discussed herein, for example, a personal computer, a laptop computer, a tablet, a smart phone, a smart watch, a mobile computing device, a server, a cloud-based device, a virtual device, an Internet appliance, an IoT (Internet of things) device, or any of the computing devices described herein, using hardware and/or software (see e.g., FIG. 6).

FIG. 2 is a more detailed block diagram illustrating the sandbox server 110 of the system of FIG. 1, respectively, according to one embodiment. The sandbox server 110 comprises a network device registration module 210, a virtual environment management module 220, an RNN learning module 230, and a network communication module 240. The components can be implemented in hardware, software, or a combination of both.

The network device registration module 210 manages communication with network devices for referrals and results. Various network devices can register for scanning services, including the firewall device 120, the access point 130 and in some embodiments the station 140. Other implementations also register gateways, routers, switches, network appliances, and Internet of Things (IoT) devices, for instance.

The virtual runtime environment management module 220 assigns files to be scanned to available virtual runtime environments. For example, virtual machines can be utilized to execute files in virtual isolation. Scanning bandwidth can be monitored, and some scans are queued until the scanning bandwidth is available.

The RNN learning module 230 detects correlations between individual events. To train an RNN to tag a behavior log as malicious or benign, behavior logs of hundreds of thousands of files with known malware or benign tags are used. During the training phase, parameters of the RNN are tuned such that it can reproduce the correct detection. This offline training phase is performed before deploying sandbox in the field. During actual runtime, a feedback loop takes a current behavior in view of the log of events and feed it into RNN to produce a detection tag. In other embodiments, different machine leaning algorithms utilize the log of events to identify viruses.

Offline parsing of thousands of behavior log is used to train RNN. Each behavior log consists of different operations. Operations that are logged include file operations, traffic over network, registry modifications, memory operations, and executed command lines. As well as these operations, other files can be downloaded or generated during running. Useful information can be extracted from each operation showing how it can affect its host running environment or what capabilities it has. For example, for the following file operation:

Operation: Modify
Path: %SYSTEMROOT%\Intelx386\WinAce 3.85 (with Serial).exe
Several capabilities can be summarized through introduction of the following tokens:
Token 1) Modified_exe,
Token 2) modified_exe_%SYSTEMROOT%
Token 3) modified_exe_%SYSTEMROOT%_Intelx386
These tokens represent that running the file copy in virtual environment has capability of modifying another executable file (exe) inside sensitive SYSTEMROOT folder.

Parsing logs result in tens of thousands of these tokens. Tokens that distinguish the most between malware and clean classes are selected. To this end, we define the following measure and use to it select best tokens that have classification:

Score(token)=absolute (Freq_in_Malware−Freq_in_Clean)/(Freq_in_Malware+Freq_in_Clean)

Where Freq denotes number of times one token is observed in its corresponding detection class malware or clean.

Examples of other tokens for Network traffic operations include: http_POST, http_GET_exe, udp_PUBLIC, tcp_PRIVATE_445. Also, Windows registry operations comprise another class of important tokens such as Number_of_Registries_Deleted, Created_Registry_in_HKLM_Software_Microsoft_Active_Setup_Path, etc. Other tokens can be defined for memory operations, file operations, and command line details. It should be noted that tokens are not limited to specific operations and can also include statistical information such as memory consumption, number of created processes, total number of file operations, etc.

A good example of statistical information that result in detection of Ransomware malware family are those that provides counts of different file type operations (document, jpeg, etc) or number of files deleted on user's folder.

Tokens of different operations, as shown in Table 1, are concatenated together to form a feature vector. As a sample continues to run, these feature vectors are constructed to form a sequence. Sequences constructed from offline lab data are used to train an RNN.

The network communication module 240 can provide network protocol services and lower layer services for packetizing data according to Ethernet or other protocols. The network communication module 240 can include transceivers with modulators, antennae and drivers to exchange data with a physical medium. An operating system can interface applications executing on stations with network services.

Figure 3:
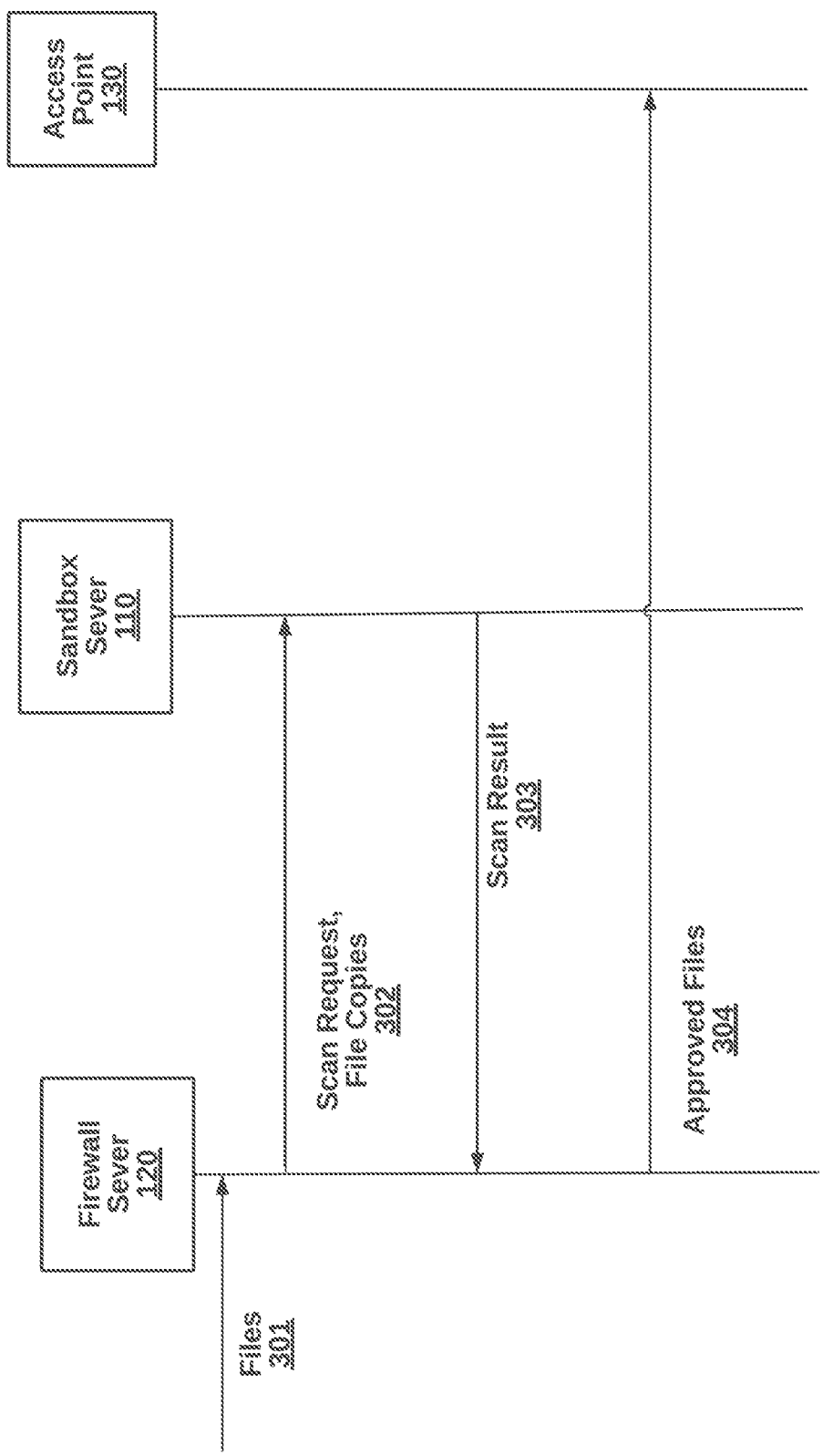
FIG. 3 is a sequence diagram showing interactions between the components of FIG. 1, according to an embodiment.

FIG. 3 is a sequence diagram illustrating an example of interactions between components of the system 100 of FIG. 1. Many other variations are possible given the teachings of the disclosure herein.

At interaction 301, a file is transmitted to the firewall server 120 (or the access point 130) from the Internet. Then, at interaction 302, a sandbox scan referral message is transmitted from the firewall device 120 to the sandbox server 110. Finally, at interaction 303, a decision of positive or negative is sent in messages from the sandbox server to the firewall server 120. If approved, at interaction 304, the file is transmitted to the access point 130 and ultimately to the station 140.

II. Methods RNN Sandbox Malware Detection (FIGS. 4-5)

Figure 4:
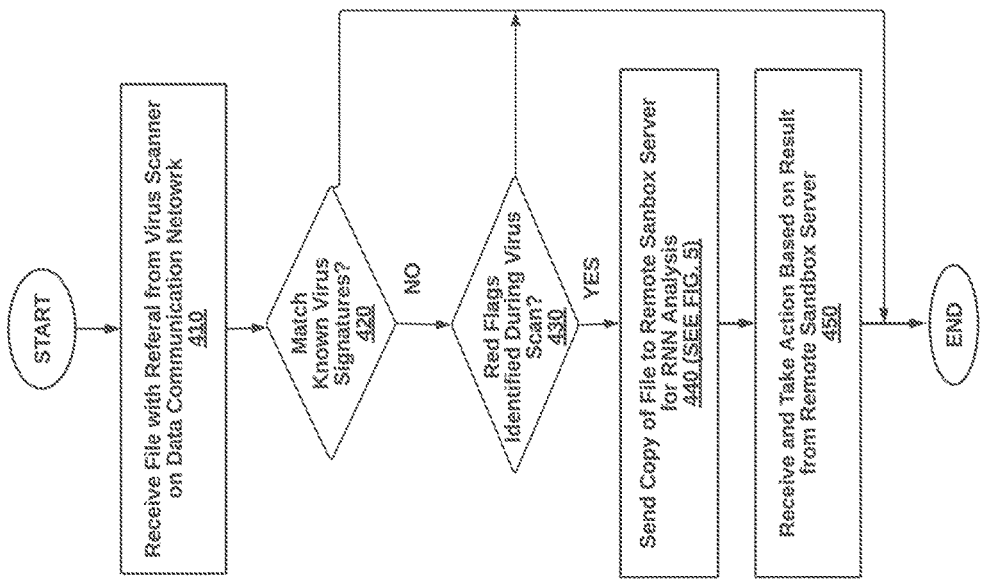
FIG. 4 is a high-level flow diagram illustrating a method for referring files from a network device to a sandbox server responsive to virus scanning, according to one embodiment.
Figure 5:
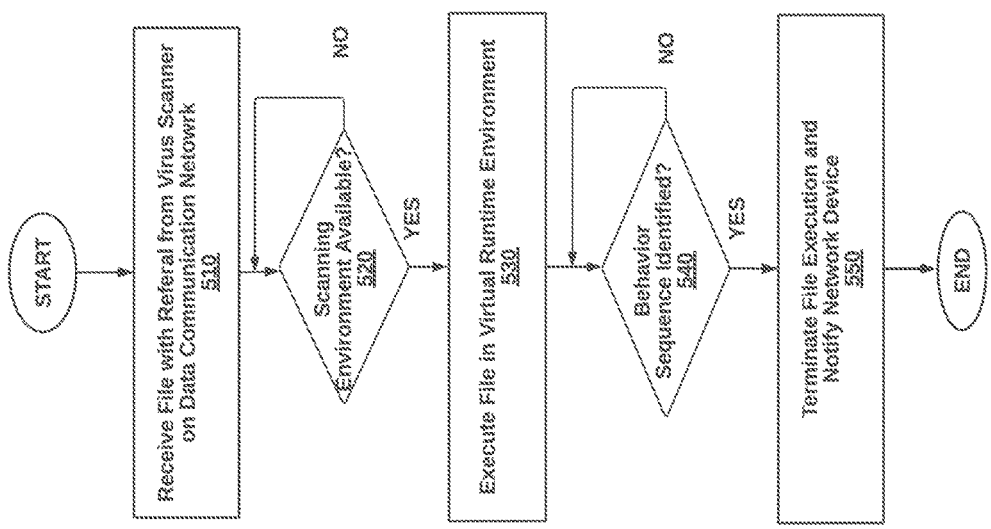
FIG. 5 is a more detailed flow diagram illustrating a step in the sandbox server of identifying malware by capturing relationships in behavior sequences with RNNs during runtime in a sandbox, without full execution, from the method of FIG. 4, according to an embodiment.

FIG. 4 is a high-level flow diagram illustrating a method for referring files from a network device to a sandbox server responsive to virus scanning, according to one embodiment. The method 400 can be implemented, for example, by the system 100 of FIG. 1. The steps are merely representative groupings of functionality, as there can be more or fewer steps, and the steps can be performed in different orders. Many other variations of the method 400 are possible.

At step 410, a network device receives a file into a queue for virus scanning. The file can be segmented across several data packets and reassembled.

At step 420, malware detection module may not match any known malware signatures while scanning the file, but does identify red flags, at step 430. The red flags can be safe actions in isolation, but also be an element in a formula for malicious behavior. In this case, at step 440, a copy of the file is sent to a remote (or local) sandbox server for RNN analysis.

At step 450, a positive result for a virus or a negative result, is received from the sandbox server based on the RNN analysis.

FIG. 5 is a high-level flow diagram illustrating a method for identifying malware by capturing relationships in behavior sequences with RNNs during runtime in a sandbox, without full execution, according to one embodiment.

At step 510, a request for runtime behavioral analysis of a file is received from a virus detection module of a remote networking device (e.g., sandbox client), along with a copy of the file (e.g., step 440), and responsive to the malware detection module detecting an anomaly (e.g., step 430) without a matching known malware signature (e.g., step 420).

At step 520, a virtual runtime environment is invoked to execute the file copy from a pool of available virtual runtime environments.

At step 530, the file copy is executed in a virtual runtime environment that tracks behavior using RNN taking runtime behavior of at least a first time into account with current runtime behavior at a second time.

At step 540, a behavior sequence is identified on-the-fly during file copy execution that is indicative of malware, prior to completing the execution, the behavior sequence involving at least two actions taken at different times during file copy execution.

At step 550, responsive to the identification, the execution is terminated and the virtual runtime environment is returned to the pool of available virtual runtime environments.

At step 560, the malware detection module of the remote networking device is responded to with a positive result to prevent file execution at the remote networking (e.g., step 450.

III. Generic Computing Device (FIG. 6)

FIG. 6 is a block diagram illustrating an example computing device 600 for use in the system 100 of FIG. 1, according to one embodiment. The computing device 600 is implementable for each of the components of the system 100. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 620 can be a network processor (e.g., optimized for IEEE 802.11, IEEE 802.11AC or IEEE 802.11AX), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method, in a sandbox server device, implemented at least partially in hardware and coupled to a plurality of networking devices on a data communication network, for identifying malware by capturing relations in sequences with recursive neural networks (RNNs) during runtime in a sandbox runtime, without full execution, the method comprising the steps of:

receiving from a malware detection module of a remote networking device of the plurality of networking devices, a request for runtime behavioral analysis of a file, along with a copy of the file, and responsive to the malware detection module detecting an anomaly without a matching known malware signature;

invoking a virtual runtime environment to execute the copy of the file from a pool of available virtual runtime environments;

executing the copy of the file in the virtual runtime environment that tracks behavior using RNN taking runtime behavior of at least a first time into account with current runtime behavior at a second time;

identifying on-the-fly a behavior sequence during file copy execution that is indicative of malware, prior to completing the execution, the behavior sequence involving at least two actions taken at different times during file copy execution;

responsive to the identification, terminating the execution and returning the virtual runtime environment to the pool of available virtual runtime environments; and responding to the malware detection module of the remote networking device with a positive result to prevent file execution at the remote networking device.

2. The method of claim 1, wherein the step of identifying the behavior sequence comprises:

identifying a download of a file resulting from the file execution at a first time;

identifying a file type change for the downloaded file at a second time; and identifying an attempt to execute the downloaded file after the file type change at a third time.

3. The method of claim 1, wherein the step of identifying the behavior sequence comprises:

identifying a copy made of a preexisting file resulting from the file execution at the first time;

identifying a file name change for the copied file at the second time; and identifying a deletion of the preexisting file.

4. The method of claim 1, further comprising:

determining that the copy of the file is digitally signed; and responsive to the determination, skipping execution of the file in the virtual runtime environment, wherein responding to the malware detection module comprises responding with a negative result to allow file execution at the remote networking device.

5. A non-transitory computer-readable media storing source code that, when executed by a processor, performs a computer-implemented method, in an access point on a data communication network and implemented at least partially in hardware, for identifying malware by capturing relations in sequences with recursive neural networks (RNNs) during runtime in a sandbox runtime, without full execution, the method comprising the steps of:

receiving from a malware detection module of a remote networking device of the plurality of networking devices, a request for runtime behavioral analysis of a file, along with a copy of the file, and responsive to the malware detection module detecting an anomaly without a matching known malware signature;

invoking a virtual runtime environment to execute the copy of the file from a pool of available virtual runtime environments;

executing the copy of the file in the virtual runtime environment that tracks behavior using RNN taking runtime behavior of at least a first time into account with current runtime behavior at a second time;

identifying on-the-fly a behavior sequence during file copy execution that is indicative of malware, prior to completing the execution, the behavior sequence involving at least two actions taken at different times during file copy execution;

responsive to the identification, terminating the execution and returning the virtual runtime environment to the pool of available virtual runtime environments; and responding to the malware detection module of the remote networking device with a positive result to prevent file execution at the remote networking device.

6. A sandbox server device, implemented at least partially in hardware and coupled to a plurality of networking devices on a data communication network, for identifying malware by capturing relations in sequences with recursive neural networks (RNNs) during runtime in a sandbox runtime, without full execution, the sandbox server device comprising:

a processor;

a network communication interface, coupled to the data communication network; and a memory, comprising:

a first module to receive from a malware detection module of a remote networking device of the plurality of networking devices, a request for runtime behavioral analysis of a file, along with a copy of the file, and responsive to the malware detection module detecting an anomaly without a matching known malware signature;

a second module to invoke the virtual runtime environment to execute a copy of the file-from a pool of available virtual runtime environments;

a third module to execute the copy of the file a copy of the file in the virtual runtime environment that tracks behavior using RNN taking runtime behavior of at least a first time into account with current runtime behavior at a second time;

a fourth module to identify on-the-fly a behavior sequence during file copy execution that is indicative of malware, prior to completing the execution, the behavior sequence involving at least two actions taken at different times during file copy execution;

a fifth module to, responsive to the identification, terminate the execution and returning the virtual runtime environment to the pool of available virtual runtime environments; and a sixth module to respond to the malware detection module of the remote networking device with a positive result to prevent file execution at the remote networking device.

* * * * *